No. 821,855. PATENTED MAY 29, 1906.
A. E. BURWELL.
FRUIT PICKER.
APPLICATION FILED JAN. 19, 1905. RENEWED MAR. 13, 1906.
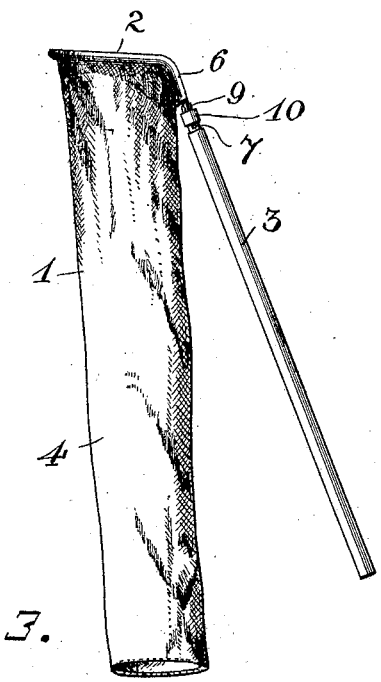
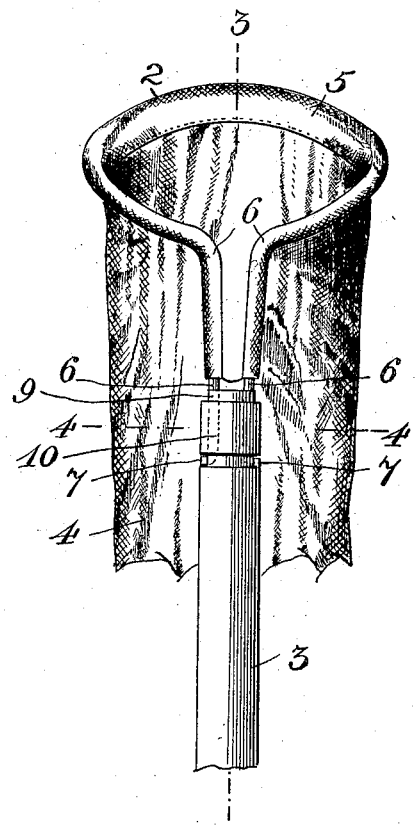
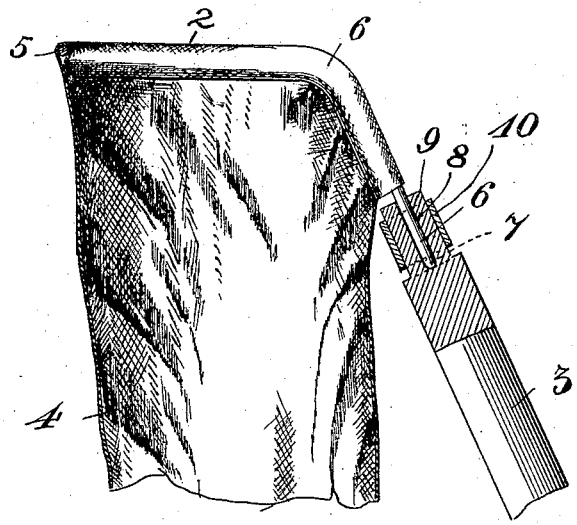
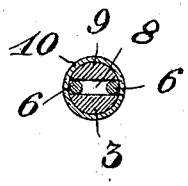
Witnesses
C. Munter
C. H. Griesbauer.
Inventor
Amos E. Burwell
by H. B. Willson
Attorney

UNITED STATES PATENT OFFICE.

AMOS E. BURWELL, OF BUTLER, PENNSYLVANIA.

FRUIT-PICKER.

No. 821,855.  Specification of Letters Patent.  Patented May 29, 1906.

Application filed January 19, 1905. Renewed March 13, 1906. Serial No. 305,884.

*To all whom it may concern:*

Be it known that I, AMOS E. BURWELL, a citizen of the United States, residing at Butler, in the county of Butler and State of Pennsylvania, have invented certain new and useful Improvements in Fruit-Pickers; and I do declare the following to be a full, clear, and exact description of the invention, such as will enable others skilled in the art to which it appertains to make and use the same.

My invention relates to a device by means of which fruit may be picked at any height from a tree or bush and conveyed to the operator's hand without injuring or otherwise bruising the fruit.

The object of my invention is to improve and simplify the construction and operation of devices of this character, and thereby render the same more convenient and durable in use and less expensive to manufacture.

With the above and other objects in view the invention consists of certain novel features of construction, combination, and arrangement of parts, as will be hereinafter described and claimed.

In the accompanying drawings, Figure 1 is a side elevation of a fruit-picker constructed in accordance with my invention. Fig. 2 is an end view of the same. Fig. 3 is a longitudinal sectional view taken on the line 3 3 in Fig. 2, and Fig. 4 is a detail transverse sectional view taken on the line 4 4 in Fig. 2.

Referring to the drawings by numeral, 1 denotes my improved fruit-picker, which comprises a frame or head 2, detachably connected to a handle 3 and having a depending conveyer spout or sack 4. The head or frame 2 is preferably formed by bending a single piece of heavy wire or metal rod to form a substantially circular loop 5 and angularly-projecting and parallel-extending arms 6, which are adapted to serve as fruit-picking jaws, the space between said jaws being sufficient to receive the stem of the fruit to be picked without causing the same to become wedged therebetween. The outer portions of these jaws 6 have their ends outturned, as shown at 7, and they are adapted to be seated in a longitudinally-extending slot 8, which is formed in a slightly-reduced portion 9 on the upper end of the handle or rod 3. Surrounding said reduced portion 9 of the handle intermediate the ends of said slot 8 is a band or ferrule which is adapted to retain the ends of said jaws 6 within said slot 8. It will be seen upon reference to Fig. 3 of the drawings that the outturned ends of the jaws 6 project out of the inner end of the slot 8 and beneath the ferrule 10, which is firmly secured upon the handle 3. Owing to the resiliency of the jaws 6 it will be seen that the latter may be sprung together to disengage their ends 7 from the lower end of the ferrule 10 when it is desired to detach the head 2 from the handle 3 to facilitate the storing or shipping of the device. The conveyer spout or sack 4, which is preferably made of textile fabric, is tubular in form and has its ends open. One of said ends is attached to the loop or frame 2, said end being folded around the loop 5 and the jaws 6, so as to cover the same, and then secured by sewing or other suitable means. The handle or rod 3 and the tubular sack 4 may be of any desired length. Said sack 4 hangs or depends from the loop or head 2 and is adapted to be held in the hand of the operator as he uses the device.

The construction, operation, and advantages of my invention will be readily understood from the foregoing description, taken in connection with the accompanying drawings. It will be seen that when the handle 3 is held in one hand and the lower end of the conveyer spout or sack 4 is held in the other, so as to close the lower open end of the same, the jaws 6 of the picker-head 2 may be readily engaged with the stem of a piece of fruit, so that by giving the handle a slight turn the stem may be readily severed from the tree to permit the piece of fruit to fall downwardly through the sack 4 and into the hand of the operator. Owing to the fact that the jaws 6 project angularly from the loop 5, the piece of fruit to be severed will be entirely within the sack 4 when its stem is severed from the tree, and owing to the fact that said jaws extend parallel throughout their length it will be impossible for the stems of the fruit to become wedged between them.

Having thus described my invention, what I claim as new, and desire to secure by Letters Patent, is—

1. A fruit-picker comprising a frame having angularly-projecting, parallel-extending, spaced picking-jaws, a handle upon the ends of said jaws, and a conveying spout or sack secured upon said frame and its jaws.

2. A fruit-picker comprising a loop-frame having its ends bent angularly and extending parallel with each other to form picking-jaws, a handle secured upon the ends of said jaws, and a tubular conveyer spout or sack having one of its open ends covering said frame and its jaws, and its other open end depending from the same, substantially as described.

3. A fruit-picker comprising a handle having a longitudinally-extending slot in one of its ends, a frame terminating in spring-jaws having outturned ends, and a band or ferrule upon the slotted end of said handle for securing the ends of said jaws in said slot, the outturned portions of said ends being adapted to project out of said slot beneath said band or ferrule.

In testimony whereof I have hereunto set my hand in presence of two subscribing witnesses.

AMOS E. BURWELL.

Witnesses:
    JOHN N. CUNDACE,
    WILLIAM E. BLOSSMAN.